United States Patent [19]
Metts

[11] Patent Number: 5,369,571
[45] Date of Patent: Nov. 29, 1994

[54] METHOD AND APPARATUS FOR ACQUIRING DEMOGRAPHIC INFORMATION

[76] Inventor: Rodney H. Metts, 4658 Pamlico Cir., Columbia, S.C. 29206

[21] Appl. No.: 80,935

[22] Filed: Jun. 21, 1993

[51] Int. Cl.$^5$ ............................................. G06F 13/00
[52] U.S. Cl. ..................................... 364/401; 364/402
[58] Field of Search ................ 235/383, 375; 364/401, 364/402, 405

[56] References Cited

U.S. PATENT DOCUMENTS

| | | | |
|---|---|---|---|
| 4,752,675 | 6/1988 | Zetmeir | 235/375 |
| 4,791,281 | 12/1988 | Johnsen et al. | 235/383 |
| 4,872,113 | 10/1989 | Dinerstein | 364/401 |
| 4,908,761 | 3/1990 | Tai | 364/401 |
| 4,954,699 | 9/1990 | Coffey et al. | 235/462 |
| 4,982,346 | 1/1991 | Girouard | 364/550 |
| 5,047,614 | 9/1991 | Bianco | 235/385 |
| 5,237,157 | 8/1993 | Kaplan | 235/375 |

Primary Examiner—Davis L. Willis
Assistant Examiner—Karl D. Frech
Attorney, Agent, or Firm—Michael A. Mann

[57] ABSTRACT

The invention is an apparatus and method for acquiring demographic data at the point of sale. In a preferred embodiment, the apparatus includes use of a bar code scanner for two purposes: identification of the product by reading the bar code it carries and for scanning bar-coded demographic selections corresponding to assessments of demographic information made by the sales clerk about the purchaser. The selections are printed onto a chart in words and associated bar code and kept at the check out counter for scanning when the goods are purchased. The two components of data: product identification data and demographic data are associated with each other and stored by a computer until transmitted for evaluation. In an embodiment alternative to the dual use of a scanner, a key pad can be used to make the demographic selections and input them to the computer along with the product identification data.

20 Claims, 2 Drawing Sheets

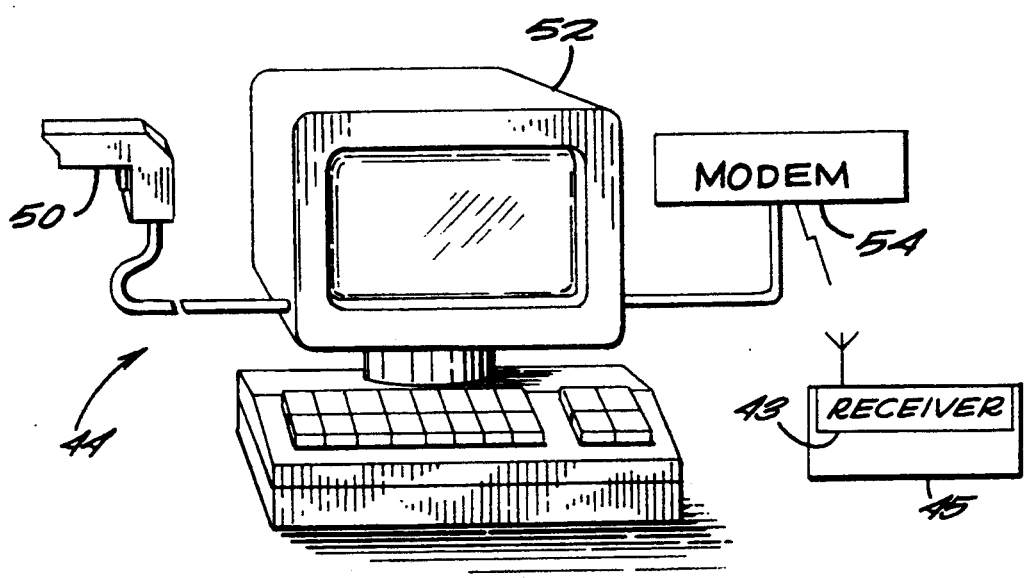

METHOD AND APPARATUS FOR ACQUIRING DEMOGRAPHIC INFORMATION

BACKGROUND OF THE INVENTION

1. Field of the Invention

The present invention relates to a method and apparatus for acquiring demographic information. More specifically, the invention relates to a method and apparatus for obtaining demographic information at the point of sale of goods or services.

2. Discussion of Background

In the competitive marketplace, the capacity for assessing trends is important for strong financial growth. Consumer demographics associated with purchasing is a strong variable for directing the advertising focus in a specific market and manufacturing production rates and direction. Gathering information about consumers of goods and services is important for assessing preference for and satisfaction with those goods and services. Customer feedback is important to manufacturers as input for future products and for assessing trends in developing markets. Consumer demographic information is available from a variety of sources including, for example, the U.S. Census, telephone surveys, or questionnaires that accompany products.

Manufacturers receive data about purchases from fluctuations in inventory and from survey cards returned by consumers. Purchasing data and consumer demographic information are extracted, compiled, and correlated into reports that help in evaluating market trends. Although such reports are helpful, the time and cost in gathering this data limit their value. There remains a need for obtaining information as close to the point of sale as possible that correlates the product purchase to the demographic characteristics of the consumer, that is convenient and cost effective.

Bar code readers are in widespread use in product purchasing. U.S. Pat. No. 5,047,614 granted to Bianco describes a computer-aided shopping method and apparatus. In this method, a consumer uses a portable barcode scanner to assemble a desired list of items to purchase. The recorded information is forwarded to the merchant for processing and subsequent, delivery of the listed items. In addition to quickly identifying a product for association with a computer-stored price, readers are known to perform comparison tasks. U.S. Pat. No. 4,791,281, granted to Johnsen, et al compares coupons through an encoding and decoding process. Coupons are presented by customers and compared against a master list to prevent repeated redemptions. U.S. Pat. No. 4,908,761, granted to Tai determines the success of advertising efforts from coded, redeemed coupons. Encoded coupons are delivered to selected households and the redeemed coupons are used to refine an original list of potential customers. U.S. Pat. No. 4,752,675, granted to Zetmeir compares coded advertising material submitted from potential customers with the initial direct mailing effort to assess the effectiveness of mass advertising.

There is yet to be a system that gathers timely demographic information by a quick and inexpensive procedure as feedback to product developers and manufacturers.

SUMMARY OF THE INVENTION

According to its major aspects and broadly stated, the present invention is an apparatus and method for acquiring demographic data relating a product and its purchaser at the point of sale. The apparatus comprises means for reading a product identification code (such as a bar code) from the product presented for purchase by the purchaser and generating a signal carrying data related to the product identity, means for making a selection from a set of selections of demographic information about the purchaser and generating a signal carrying that demographic data, means for storing the signals in association with each other, and means for transmitting the demographic data signal together with the associated product identification signal to a central point for evaluation.

To generate the demographic data, the sales clerk first makes an assessment concerning certain demographic information about the purchaser. The selecting means enables the clerk to input the results of this assessment by selecting from a set of selections a selection for each type of demographic information to be obtained and to generate the signal related to that selection. Preferably, if a bar code scanner is used to decode the bar code on the product to generate the first signal, the same scanner is used to scan bar codes of demographic choices printed on a chart. Alternatively, a keypad with keys or buttons can be used to input the demographic choices of the clerk based on the assessment. The signals corresponding to product identity data and demographic data are associated with each other and stored until, batchwise and at intervals, they are transmitted to a central point for evaluation.

An important feature of the present invention is the use of a bar code scanner for making the demographic selections. Optical readers, such as bar coding devices, are fairly commonplace in the retail industry for identifying goods for associating them with pricing, and, therefore, can be used conveniently to serve both reading and selecting functions. In those locations without optical scanners or where the scanner cannot easily be adapted for reading a chart of demographic selections, a keypad can be used instead. Using a handheld scanner for both purposes, however, greatly simplifies the process of recording the assessments; the clerk can simply scan the product and, without putting the scanner down, scan the chart.

Another important feature of the present invention is the combination of the storing and transmitting means. The demographic information can be stored by the storing means until a batch of such information can be transmitted for evaluation, perhaps by modem. In a system of chain stores served by a central warehouse, for example, the data can be transmitted to the warehouse for evaluation of restocking needs. In other applications such as, for example, popularity ratings of movies, video rentals or compact disc sales, the data can be transmitted almost in real time.

Other features and advantages will be apparent to those skilled in the art from a careful reading of the Detailed Description of a Preferred Embodiment presented below and accompanied by the drawings.

BRIEF DESCRIPTION OF DRAWINGS

In the drawings,

Fig. I is a perspective drawing of the apparatus for acquiring consumer demographic information according to a preferred embodiment of the present invention;

FIG. 4 is an alternative, preferred embodiment according to the present invention.

DETAILED DESCRIPTION OF PREFERRED EMBODIMENTS

The present invention, in one preferred embodiment, uses an optical scanner, of the type typically present at check-out counters in retail stores for associating with a price the goods presented for purchase by the consumer, to input demographic data about the purchaser and the identification data about the product at the point of sale. The data is transmitted, preferably in batches and at intervals, for evaluation. The invention may rely on assessments by the clerk of various choices of demographic information about the purchaser, such as age, race and gender. In other applications, the assessments may be made in other ways or be based on purchaser response.

In this detailed description, use will be made of an example based on the sale of compact discs at a store and their association with age, gender and race. However, it will be apparent to those skilled in the art, that the present invention is applicable to other goods and services, other demographic data and other contexts for the transaction.

Also, the term "purchaser" is meant to include those who have selected goods or services and are presenting them for "purchase." A financial transaction need not actually be involved and the term "purchase" simply means that the "purchaser" has made a choice with respect to those goods to transfer possession of the goods from the store. A purchaser can be a patron in a restaurant or raffle ticket buyer; he can be renting a video cassette or a car; he can be a student in a cafeteria line.

Most commonly, the purchaser is in a store where his selection of goods or services is presented at a check-out counter to a clerk. Ideally, the present invention is suited for stores with one or only a few product types: video cassettes and compact discs. Also, stores that are part of a network or chain can pool information for both restocking purposes and for feedback to product producers about consumer preference.

The present method includes acquiring demographic data about a purchaser selecting a product associated with the identification of the product selected. The product needs to be identified, preferably by reading a bar code carried by the product with a bar code scanner. In many stores the product code would be scanned at the check out counter anyway in order to associate price with the product for preparing the sales receipt. A bar code is of course a series of lines or bars whose thicknesses represent a coded value that correlates with information about the product storable in a computer. A scanner is an optical/electronic device that "reads" the bars by directing a beam of light across the series and finding the start and end of each bar with the reflected beam, noting the thicknesses and relating that information through the code to the value.

Figure 1:
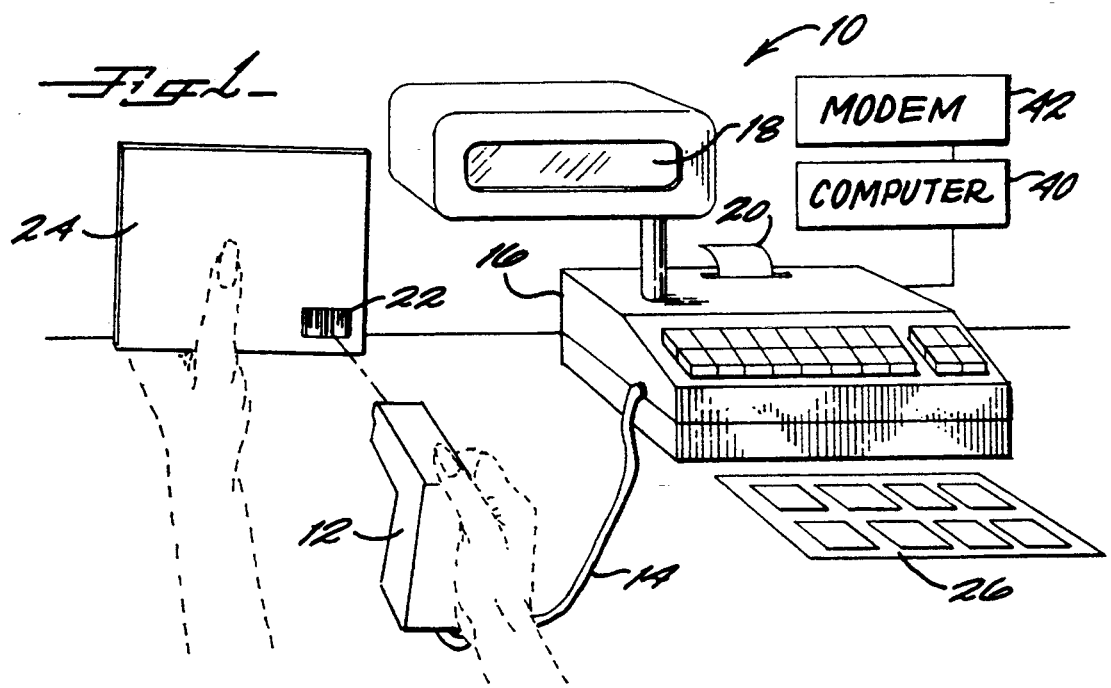

The apparatus of the present invention is illustrated in FIG. 1. The apparatus, generally indicated by reference numeral 10, comprises a handheld optical bar code scanner 12, connected by an electrical cable 14 to a cash register 16. Cash register 16 may be connected to a general purpose computer 40 programmed to perform the present method or a may be a dedicated computer 44, as illustrated in FIG. 4 and as described more fully below. Cash register 16 may be a typical cash register that associates the product identification data with a price, displays the price in a display 18 for the purchaser, and prints out a receipt 20.

The clerk scans a bar code 22 on a product 24 with scanner 12 to determine the identification of product 24, perhaps both for the purposes of determining price and associating with demographic data to be acquired. That product identification data will be recorded in cash register 16 and transmitted to computer 40. Next, the clerk makes an assessment of certain demographic information about the purchaser. A clerk can usually determine, for example, the race, gender and approximate age of the purchaser. Although this assessment relies on the judgment of the clerk, a little practice and training is usually sufficient to produce good assessments and any errors are likely to be either statistically insignificant or would tend to be off-setting.

The assessment may be recorded in computer 40 in several ways, as will be described below. Computer 40 is programmed to associate demographic data with product identification data. Computer 40 stores the demographic and product identification data in association with each other until they are transmitted via a modem 42 for evaluation to a receiver 43 (see FIG. 4) at a central location 45 either distant or proximate. The associated data can be transmitted in batches at preselected intervals of time: monthly, weekly, daily; or may be transmitted very frequently making the data available for evaluation on an almost real time basis.

Figure 2:
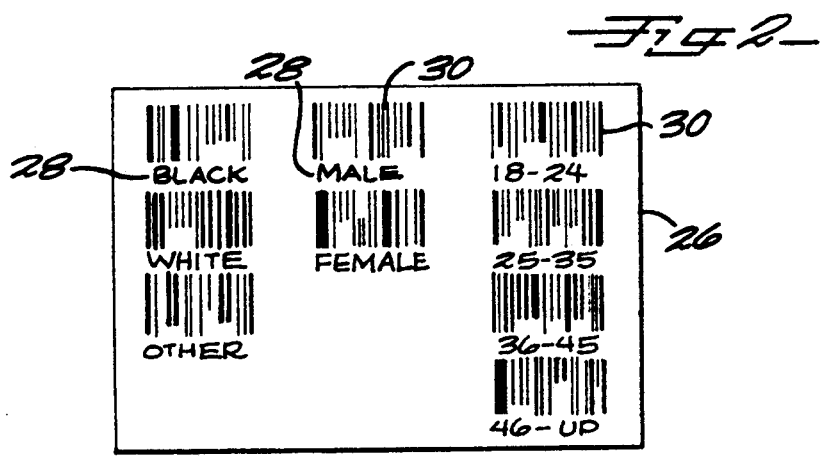
FIG. 2 is a front view of a selecting means for selecting demographic information from a set of selections of demographic choices according to a preferred embodiment of the present invention.

The assessment is recorded preferably by using the same handheld, bar code scanner 12 that was used to read bar code 22 identifying product 24. If a chart 26 (best seen in FIG. 2) is made available with the appropriate set of selections for each type of demographic information: "male" and "female" for gender, or "white," "black," "other" for race, for example, and if each selection 28 is shown on chart 26 in words for the clerk to read adjacent to an associated bar code 30 for scanning, then bar code 30 can be scanned by the clerk with bar code scanner 12. Optical scanning thus acts to record electronically the assessment of the clerk. In other words, the clerk selects a demographic code from a set of demographic codes on chart 26 and records selection 28 with the scanner. Each demographic code of that set corresponds to one selection 28 from a set of selections of assessments of demographic data the clerk has made, and the clerk chooses the demographic code that corresponds to his or her assessment about the purchaser. For example, the clerk knows that one element of demographic information needed about the purchaser is the purchaser's gender. The clerk makes an assessment that the purchaser is male and looks at the chart. Finding selection 28 "male" with that choice encoded in bar code format next to selection 28, the clerk scans the code to record his assessment of the gender of the purchaser. Bar code scanner 12 generates an electrical signal related to said selected demographic code that relates to selection 28 and that is then recorded by cash register 16.

Figure 3:
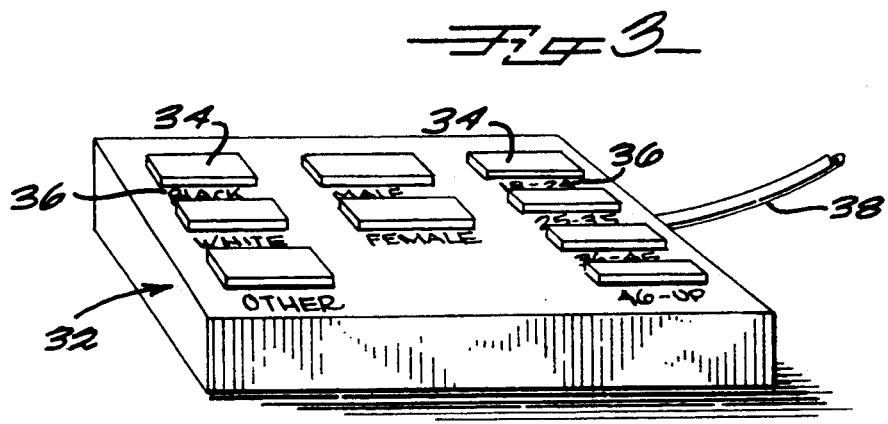
FIG. 3 is a perspective view of a selecting means according to an alternative embodiment of the present invention.

Alternatively, a small key pad 32 (FIG. 3) with keys or buttons 34 labeled with the appropriate set of selections 36 of demographic information and preferably inserted in line between scanner 12 and cash register 16 can be used to record selection 36 simply by pressing the correct button 34 so that it moves from a nominal position to a depressed position. If inserted in line, rather than parallel to scanner, keypad 32 should be equipped with a bypass switch (not shown). Button 34 when moved to its depressed position, acts to close switches in keypad 32 which generate electronic signals, transmitted through electronic cable 38 to cash register 16, that "tell" cash register 16 what selection 36 has been made. Key pad 32 may be suitable for stores where there is no scanner or where the scanner is not readily adaptable for reading a selection from a chart. For example, grocery stores, if they have scanners, have them mounted in the counter so that an object can be passed over them for reading the product identification code. Of course, computer 40, if not linked to a scanner that obtains the product identification data, would need to receive it in some other way, such as keying the product identification information in directly.

The steps of the method of acquiring demographic information are not limited to any recited order. The purchasing data and demographic data must only be recorded at the point of sale; contemporaneous belonging to the same time or period, either before, during, or immediately after the actual purchase and before the next purchase. Furthermore, it would be apparent that cash register 16 could be programmed to associate the demographic selections of one purchaser with several products where that purchaser buys several compact discs, to use that example, at one time. This association can be made by using a "repeat" key on a key pad or simply by associating the demographic selections with all products purchases since the previous demographic choices were selected, thus using the demographic choices as an indicator of a completed transaction. Other ways will be apparent to those skilled in the art.

Computer 40 stores first output signal and second output signal in association with each other. Modem 42 connected to computer 40 enables transmission of the data at intervals and preferably batchwise for reduced transmission cost if the data are to be transmitted over telephone lines to a central station (not shown) for evaluation. Modem 42 transmits the associated first output signal and second output signal at preselected intervals of time either through telecommunicative, optical, or electrical communications.

FIG. 4 shows an alternative embodiment of the present invention where a scanner 50 is connected directly to a computer 52 that can serve as a cash register, performing both the function of the cash register in providing pricing corresponding to product identity and also the function of the computer in associating the demographic information with the product identity and storing the associated data until transmission via modem 54. This modified cashier register/computer would save counter space and would be especially beneficial for use of the demographic data by store management.

The data will reflect a depletion of inventory, perhaps to be replenished, and also consumer preferences. The latter will be useful to producers of the product who can generate more products preferred by consumers and who can use the changes in consumer preference to predict trends. Affiliated stores such as chain stores and franchises can pool the demographic data for various purposes related to inventory and consumer preference. In the home entertainment industry, authors, artists, and producers can use the information to better meet consumer demand and to predict the success of their products. The point-of-sale demographic data will also help them understand the acceptance of their existing products. Other uses of demographic data about consumers and associated with products purchased by those consumers will be apparent.

It will be apparent to those skilled in the art from a careful reading of the detailed description of the foregoing preferred embodiments that many modifications and substitutions can be made in the foregoing without departing from the spirit and scope of the invention. The present invention, moreover, is not limited to the specific example of uses given but, rather, is defined by the appended claims.

What is claimed is:

1. A method for acquiring demographic data about a purchaser selecting a product, said product having an identification, said method comprising the steps of:

determining said identification of said product upon selection of said product by said purchaser for purchase;

recording said identification as identification data;

making an assessment regarding demographic information about said purchaser:

recording said assessment as demographic data; and associating said demographic data with said identification data.

2. The method as recited in claim 1, wherein said method further comprises the step of storing said associated demographic and identification data.

3. The method as recited in claim 1, wherein said method further comprises the step of transmitting said associated demographic and identification data to a central location.

4. The method as recited in claim 1, wherein said method further comprises the steps of:

storing said associated demographic and identification data; and transmitting said associated demographic and identification data to a central location.

5. The method as recited in claim 1, wherein said method further comprises the steps of:

storing said associated demographic and identification data; and transmitting said associated demographic and identification data to a central location at preselected intervals of time.

6. The method as recited in claim 1, wherein said product carries a product identification code and said determining step further comprises scanning said product identification code to determine said identification.

7. The method as recited in claim 1, wherein said recording step further comprises the step of making selections based on said assessment of demographic information from a preselected set of selections of possible assessments.

8. The method as recited in claim 1, wherein said recording step further comprises the steps of:

selecting a demographic code from a set of demographic codes, each demographic code of said set of demographic codes corresponding to one selection from a set of selections of assessments of demographic data, said selected demographic code corresponding to said assessed demographic information of said purchaser; and generating an electrical signal related to said selected demographic code.

9. The method as recited in claim 1, wherein said recording step further comprises the steps of:
   selecting a demographic code from a set of demographic codes, each demographic code of said set of demographic codes corresponding to one selection from a set of selections of assessments of demographic data, said selected demographic code corresponding to said assessed demographic information of said purchaser; and
   generating an optical signal related to said selected demographic code.

10. A method for acquiring demographic data about a purchaser selecting a product, said product having an identification code, said method comprising the steps of:
   reading said identification code of said product upon selection of said product by said purchaser for purchase so that an electrical signal related to said product code is generated;
   recording said identification code as identification data;
   making an assessment regarding demographic information about said purchaser;
   selecting a demographic code from a set of demographic codes, each demographic code of said set of demographic codes corresponding to one selection from a set of selections of assessments of demographic data, said selected demographic code corresponding to said assessed demographic information of said purchaser;
   generating a signal related to said selected demographic code; and
   associating said demographic data with said identification data; and
   storing said associated demographic and identification data.

11. The method as recited in claim 10, wherein said set of demographic codes are associated with a set of switches, said selected demographic code corresponds to one switch of said set of switches, and said selecting step further comprises the step of closing said one switch.

12. The method as recited in claim 10, wherein said set of demographic codes are in the form of bar codes and said selecting step further comprises the step of scanning said demographic code with a bar code reader.

13. The method as recited in claim 10, wherein said set of demographic codes and said product identification codes are in the form of bar codes and said selecting step further comprises the step of scanning said demographic code with a bar code reader, and said reading step further comprises scanning said product identification code with said bar code reader.

14. The method as recited in claim 10, further comprising the step of:
   transmitting said associated demographic and identification data to a central location.

15. The method as recited in claim 10, further comprising the step of:
   transmitting said associated demographic and identification data to a central location at preselected intervals of time.

16. Apparatus for acquiring demographic data about a purchaser selecting a product, said product having a product identification code, said apparatus comprising:
   means for reading said identification code, said reading means producing a first output signal;
   means for making a selection of demographic data from a set of selections of demographic data said making means producing a second output signal; and
   means for storing said first and said second output signals in association with each other.

17. The apparatus as recited in claim 16, wherein said selecting means further comprises a keypad carrying an array of buttons, each button of said array of buttons corresponding to one selection of a set of selections of demographic information, said each button have a depressed position and a nominal position, said button producing said second output signal when in said depressed position and not producing said second output signal when in said nominal position.

18. The apparatus as recited in claim 16, wherein said selecting means further comprises:
   a chart carrying a set of selections of demographic assessments, each selection of said set of selections encoded in a bar code format; and
   a bar code scanner for scanning said each selection.

19. The apparatus as recited in claim 16, wherein said product identification code is in bar code format, and wherein said reading means further comprises a bar code reader and said selecting means further comprises a chart carrying a set of selections of demographic assessments, each selection of said set of selections encoded in bar code format so that said bar code scanner can scan said each selection.

20. The apparatus as recited in claim 16, wherein said making means further comprises means for associating said product identification code with a price, and said apparatus further comprises means responsive to said making means for displaying said price.

* * * * *